(12) United States Patent
Sashida et al.

(10) Patent No.: US 6,720,374 B2
(45) Date of Patent: Apr. 13, 2004

(54) ALIPHATIC POLYESTER COMPOSITION AND FLEXIBLE PRODUCTS

(75) Inventors: Kazuyuki Sashida, Yawata (JP); Tadashi Hasebe, Hirakata (JP)

(73) Assignee: Riken Vitamin Co., Ltd., Tokyo (JP)

( * ) Notice: Subject to any disclaimer, the term of this patent is extended or adjusted under 35 U.S.C. 154(b) by 1 day.

(21) Appl. No.: 10/153,589

(22) Filed: May 24, 2002

(65) Prior Publication Data

US 2003/0083440 A1 May 1, 2003

(30) Foreign Application Priority Data

Jun. 19, 2001 (JP) .................................... P2001-184795
Apr. 11, 2002 (JP) .................................... P2002-109231

(51) Int. Cl.[7] .............................................. C08L 67/04
(52) U.S. Cl. ........................... 524/310; 524/10; 524/41; 524/47; 524/308; 524/312; 524/313; 525/411; 525/415
(58) Field of Search ................. 524/308, 310, 524/312, 313, 10, 41, 47; 525/411, 415

(56) References Cited

U.S. PATENT DOCUMENTS 5,500,465 A 3/1996 Krishnan et al.
5,753,782 A 5/1998 Hammond et al.

FOREIGN PATENT DOCUMENTS

EP 1 029 890 A2 8/2000
GB 364 807 1/1932

*Primary Examiner*—Patricia A. Short
(74) *Attorney, Agent, or Firm*—Roylance, Abrams, Berdo & Goodman, LLP

(57) ABSTRACT

The present invention relates to biodegradable plastics and biodegradable plastic products thereof having flexibility, and more specifically, it aims to provide a plasticizer for providing aliphatic polyester, in particular, polylactic acid with flexibility, an aliphatic polyester composition using the same, a film, a sheet, a bag and the like obtained by molding said composition, that are, with respect to 100 parts by weight of aliphatic polyester, (1) an aliphatic polyester compound which contains polyglycerol acetic ester by 5–50 parts by weight, (2) an aliphatic polyester compound which contains polyglycerol acetic ester and acetic and fatty acid ester of glycerol having a specific structure by 5–50 parts by weight, and (3) flexible products which are obtained by molding the fatty polyester compound indicated in the above (1) or (2) into films, sheets, bags or the like.

14 Claims, No Drawings

ALIPHATIC POLYESTER COMPOSITION AND FLEXIBLE PRODUCTS

BACKGROUND OF THE INVENTION

1. Field of the Invention

The present invention relates to a biodegradable plastics and biodegradable plastic products thereof and particularly, it relates to a biodegradable aliphatic polyester composition and flexible moldings, which are prepared by blending aliphatic polyester containing polylactic acid as its major constituent with a plasticizer having a specific structure.

2. Description of the Prior Art

Plastic products of polyethylene, polystyrene, polypropylene, polyvinyl chloride and the like have been utilized in various and wide fields of food packaging, building materials, home electrical appliances and the like and have become indispensable in daily life.

However, while on one hand such plastic products have a feature of durability, they also have disadvantages in causing destruction to the environment, such that when they have fulfilled their utilizing purpose and have become waste, they show poor degradability in nature because of their superior durability and affect the biological system.

For overcoming such disadvantages of plastics, biodegradable plastics have received considerable attention. Biodegradable plastics are degraded into low molecular weight compounds in an extremely short time by enzymatic actions produced by microorganisms which inhabit the environment, and is finally degraded into inorganic substances such as water and carbon dioxide.

With the growing awareness of environmental problems in recent years, recycling of plastic products has been legislated, and along with recycling and reuse thereof, the so-called biodegradable plastics, which can be easily degraded in the environment, have received considerable attention and both governments and the private sector have keenly carried out research and development thereof. As uses thereof, application to agricultural materials (such as, for example, sheets or films to be used for greenhouses for growing root vegetables) to be used in the environment, materials (such as, for example, food package films, sheets, or bags) to be used in the food packaging field where collection is difficult and, other packaging materials (such as, for example, sheets, films, or bags for packaging clothes or convenience goods), etc., has been anticipated.

Such biodegradable plastics can be divided into some large groups such as microorganism-producing system, natural substance-utilizing system, and chemically synthesized system, and wherein aliphatic polyester system, denatured polyvinyl alcohol system, denatured starch system, and other system are now on first steps for practical use.

Polybutylene succinate, polyhydroxybutyrate and the like can be used as for aliphatic polyester plastics, and polylactic acid can be used as for a semi-synthetic copolymer.

Polylactic acid is a crystalline thermoplastic macromolecular having tensile strength equivalent to that of polyethylene and transparency equivalent to that of polyethylene terephthalate, is used in medical suture threads and the like, is highly safe and, when burned, the small combustion calorie which is approximately ⅓ of that of polyethylene, polypropylene or the like causes less damage to an incinerator, and generates no poisonous gas. Moreover, with these advantages, in recent years, research and development of manufacturing methods, application, uses and the like have become active, therefore, diversification of uses and an accompanying increase in production are expected in the future.

Polylactic acid has such advantages, however, on the other hand, wherein plastic products thereof are hard and the utilization has been restricted in fields which require softness and, particularly, in films, package materials and the like. The addition of a plasticizer is one of method for improving hardness and providing softness, and for actions as a plasticizer, conditions such as:

(1) being excellent in compatibility with a polymer or a resin to be plasticized, (2) having good plasticizing efficiency, and (3) showing no deterioration in performance due to volatilization, transition, or oozing after processing, must be provided.

As a plasticizer for containing polylactic acid and a resin containing polylactic acid as its major constituent, triacetin (Shimazu Hyoron, Vol.54, No. 155 (1997. 3): Japanese Unexamined Patent Publication No. Hei-6-184147: Japanese Unexamined Patent Publication No. Hei-7-177826), ester of aliphatic dicarboxylic acid and/or chain molecular diol or an aliphatic polyester containing these as its major constituents (Japanese Unexamined Patent Publication No. Hei-8-199053: Japanese Unexamined Patent Publication No. Hei-8-245866), triacetin, tributyn, or butylphthalyl butylglycolate (Japanese Unexamined Patent Publication No. Hei-9-296103), a glycerol derivative including an alkyl group having carbon numbers 1–10 (Japanese Unexamined Patent Publication No. Hei-11-323113), diacetyl monoacyl glycerol inclduing an acyl group having carbon numbers 6–18 (Japanese Unexamined Patent Publication No. 2000-302956) and the like have been disclosed. However, each of these has advantages and disadvantages in performance and physical characteristics and is not sufficiently satisfactory.

SUMMARY OF THE INVENTION

The Objects of the Invention:

It is an object of the present invention to provide a plasticizer for providing aliphatic polyester, in particular, polyactic acid with flexibility, an aliphatic polyester composition using the same and flexible moldings which are obtained by molding said composition into films, sheets, bags and the like.

In order to solve the above problem, the present inventors have repeatedly carried out intensive research studies and consequently discovered that the above object is achieved by blending aliphatic polyester with a specific compound as a plasticizer. Based on this knowledge, the present invention has been reached.

In order to solve the above problem, the present invention has the following constructions.

1. An aliphatic polyester composition which contains, with respect to 100 parts by weight of aliphatic polyester, polyglycerol acetic ester by 5–50 parts by weight.

2. An aliphatic polyester composition which contains, with respect to 100 parts by weight of aliphatic polyester, polyglycerol acetic ester and a compound represented by the following general formula (1) by 5–50 parts by weight.

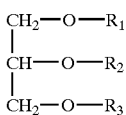

General formula (1)

In the formula, one or two of $R_1$, $R_2$, and $R_3$ is an acyl group having carbon numbers 8–22 and the rest thereof are acetyl groups or hydrogen atoms.

3. An aliphatic polyester composition as set forth in claim 2, wherein in the general formula (1), one or two of $R_1$, $R_2$, and $R_3$ is an acyl group having carbon numbers 8–18 and the rest thereof are acetyl groups.

4. An aliphatic polyester composition as set forth in the above 2, wherein the compound represented by the general formula (1) is at least one selected from glycerol diacetomonocaprirate, glycerol diacetomonolaurate, and glycerol diacetomonooleate.

5. An aliphatic polyester composition as set forth in any of the above 1–4, wherein the polymerization degree of polyglycerol as a component of polyglycerol acetic ester is 2–4.

6. An aliphatic polyester composition as set forth in any of the above 1–5, wherein the acetylization degree of polyglycerol acetic ester is 50–100%.

7. An aliphatic polyester composition as set forth in any of the above 1–6, wherein the polyglycerol acetic ester is at least one or a mixture of two or more selected from diglycerol diacetate, diglycerol triacetate, and diglycerol tetraacetate.

8. An aliphatic polyester composition in which the aliphatic polyester as set forth in any of the above 1–7 is polylactic acid.

9. Flexible products which are obtained by molding the aliphatic polyester composition as set forth in any of the above 1–8 into films, sheets, bags or the like.

DETAILED DESCRIPTION OF PREFERRED EMBODIMENTS

The present invention will be described in further detail.

The polyester in the present invention mainly deals with polylactic acid. A polylactic resin of any degree of polymerization or quality can be used. Not only a homopolymer of polylactic acid, but also a copolymer of glycolic acid, ε-caprolactone, trimethylene carbonate, polyethylene glycol or the like may be concomitantly used. In addition, to the extent where the physical characteristics of the polylactic resin are not lost, another biodegradable macromolecule such as cellulose acetate, polycaprolactone, polybutylene succinate, a polyhydroxybutyrate-valerate copolymer, chitin, chitosan, or starch may be blended.

Polyglycerol acetic ester is used as a main plasticizer in the present invention. Herein, as polyglycerol, glycerol having an average polymerization degree of 2–12 can be mentioned, which is preferably, 2–6, and more preferably, 2–4. Concretely, diglycerol, triglycerol, tetraglycerol, pentaglycerol, hexaglycerol and the like can be exemplified, and these can be used alone or as a mixture with an arbitrary combination.

The formula for polyglycerol acetic ester is not particularly limited, however, for example, a method where acetic anhydride is used, an esterification reaction using acetic acid and the like can be mentioned. The esterification degree of acetic acid with respect to a hydroxyl group of polyglycerol (hereinafter, abbreviated as an "acetylization ratio") is preferably 50% or more, and more preferably, 75–100%.

The acetylization ratio of polyglycerol acetic ester is calculated by the following formula.

[Numerical formula 1]

Acetylization ratio=Ester value/Ester value+Hydroxyl group value×100    Formula (1)

Herein, Ester value=Saponification value−Acid value

In the present invention, polyglycerol acetic ester and glycerol acetic fatty ester expressed by the above general formula (1) may be concomitantly used as a plasticizer. In this case, the ratio of polyglycerol acetic ester is preferably 10 weight percent or more in the mixture of both.

An acetyl group of the glycerol acetic fatty ester used herein is 2 mol or less on average with respect to 1 mol-glycerol. An acyl group having carbon numbers 8–22 (hereinafter, referred to as an "acyl group of C8–22"), preferably, having an acyl group of C8–18 is 1 mol or more on average with respect to 1 mol-glycerol. In addition, in consideration of compatibility between this compound and aliphatic polyester, the hydroxyl group value of this compound is preferably 20 or less. In addition, the state of this compound is preferably liquid at room temperature for workability.

In the general formula (1), ester where at least one of $R_1$, $R_2$, and $R_3$ is an acyl group of C8–22 and the rest thereof are acetyl groups is further preferable. As particularly preferable compounds, glycerol diacetomonocaprirate, glycerol diacetomonolaurate, and glycerol diacetomonooleate can be mentioned, and these can be used alone or in a mixed fashion. As commercial products of glycerol diacetomonolaurate, RIKEMAL PL-004, PL-012, and PL-014 [manufactured by Riken Vitamin Co.,Ltd., trade names] can be mentioned, and as commercial products of glycerol diacetomonooleate, POEM G-038 and POEM G-048 [manufactured by Riken Vitamin Co.,Ltd., trade names] can be mentioned.

The amount of these plasticizers to be added influences the finished products in terms of the degree of crystallization, flexibility, heat resistance and the like. If the amount to be added is too great, the degree of crystallization and heat resistance decline, whereas if it is too small, sufficient flexibility cannot be obtained. Based on such a viewpoint, the amount of the plasticizers to be added is preferably 5–50 parts by weight with respect to 100 parts by weight of aliphatic polyester, and more preferably, 10–30 parts by weight.

To an aliphatic polyester composition according to the present invention, in addition to the aliphatic polyester as the major constituent and the plasticizer of the present invention (a polyglycerol acetic ester alone or a mixture of this polyglycerol acetic ester and a compound expressed by the above general formula (1)), to the extent where the object of the present invention is not lost, additives such as an anti-blocking agent, a lubricant, an antistatic agent, an anticlouding agent, a ultraviolet absorbing agent, a heat stabilizer, an antioxidant, a color protector, a filler, a pigment, a flame retardant and the like may be added according to use. As these additives, widely known additives can be used without particular restriction.

For the aliphatic polyester composition according to the present invention, a method where, after aliphatic polyester, a plasticizer of the present invention, and, in some cases, other additives are mixed to become uniform by means of a high-speed or low-speed stirrer, the mixture is melted and kneaded by means of a single screw or multi-screw extruder having a sufficient kneading ability can be employed. The shape of an aliphatic polyester composition (a resin composition) according to the present invention is preferably pellets, a stick shape, powder and the like.

The aliphatic polyester composition (resin composition) obtained as in the above is molded into a film shape or a sheet shape by a hot extrusion method using an extruder fitted with a T-die. In addition hereto, manufacturing can also be carried out by a hot extrusion method using an extruder fitted with a circular die, that is, by an inflation molding method.

The drawn film or sheet obtained by the above method may be cut into an appointed size and used as a cut sheet, or the drawn film may be formed into a bag shape and used. As a method for forming a bag, a heat sealing method, a high-frequency method and the like can be mentioned.

Objects to be packaged by these drawn films or sheets are not particularly limited. In general, food, medical supplies, cosmetics, fertilizers, electric appliances, paper products, and refuse thereof, etc., can be mentioned. Preferably, foods such as vegetables, fruits, seafood, meat, grain, dried foodstuffs, bread, dairy products, noodles, sweets, confectionery, wild plants, and seasonings and refuse thereof, etc., can be mentioned.

As concrete examples for use as bags, food bags, shopping bags, disposal bags, compost bags, and sandbag sacks, etc., can be mentioned. As concrete examples for use as cut sheets, wrapping films for food packages, wrapping films for cosmetics, wrapping films for medical supplies, wrapping films for surgical liniment, wrapping films for agriculture, and wrapping films for electric appliances, etc., can be mentioned. In addition, drawn films or sheets can be used as flexible moldings such as agricultural films for horticultural facilities and the like, base material films for adhesive tapes, and waterproof sheets.

EMBODIMENT

Hereinafter, the present invention will be described concretely by means of an embodiment.

[Test sample]

<Sample 1> Diglycerol acetic ester (Acetylization ratio: 50%)

<Sample 2> Diglycerol acetic ester (Acetylization ratio: 75%)

<Sample 3> Diglycerol acetic ester (Acetylization ratio: 100%)

<Sample 4> Triglycerol acetic ester (Acetylization ratio: 100%)

<Sample 5> Tetraglycerol acetic ester (Acetylization ratio: 100%)

<Sample 6> Hexaglycerol acetic ester (Acetylization ratio: 100%)

<Sample 7> Decaglycerol acetic ester (Acetylization ratio: 100%)

<Sample 8> Diglycerol acetic ester (Acetylization ratio: 100%)/Glycerol diacetomonocaprirate=1:9

<Sample 9> Diglycerol acetic ester (Acetylization ratio: 100%)/Glycerol diacetomonocaprirate=1:1

<Sample 10> Diglycerol acetic ester (Acetylization ratio: 100%)/Glycerol diacetomonocaprirate=3:1

<Sample 11> Diglycerol acetic ester (Acetylization ratio: 100%)/Glycerol diacetomonolaurate=1:1 <Trade name: RIKEMAL PL-012, manufactured by Riken Vitamin Co., Ltd.>

<Sample 12> Diglycerol acetic ester (Acetylization ratio: 100%)/Glycerol diacetomonooleate=1:1 <Trade name: POEM G-038, manufactured by Riken Vitamin Co.,Ltd.>

<Sample 13> Diglycerol acetic ester (Acetylization ratio: 100%)/Glycerol diaceto monoerucin=1:1

<Sample 14> Diglycerol acetic ester (Acetylization ratio: 100%)/Glycerol monoaceto dilaurate=1:1

<Sample 15> Di(2-etylhexyl) phthalate <Commercially available product>

<Sample 16> Dibutyl phthalate <Commercially available product>

<Sample 17> Acetyl tributyl citrate <Commercially available product>

<Sample 18> Glycerol triacetate <Commercially available product>

[Preparation example 1]

Polylactic acid [Trade name: Polylactic acid Lacty #9021 (Average molecular weight: 145,000) manufactured by Shimadzu Corporation] was heated at 110° C. for 4 hours for elimination of moisture contained therein. Then, a prescribed amount of plasticizer was added to 100 parts by weight of the dry polylactic acid thus obtained and mixed to become uniform by means of a high-speed stirrer. Thereafter, the mixture was melted and kneaded by means of a twin screw extruder and extruded at 200° C., whereby pellets were fabricated.

[Test example 1] Tensile test (Conforms with JIS K-7113)

In terms of the respective pellets obtained in Preparation example 1, first test pieces were fabricated by means of an injection molding machine (IS55EPN, manufactured by Toshiba Machine Co., Ltd.), and the pieces, after preservation for a day under conditions wherein the temperature was 23° C. and the relative humidity was 50%, were supplied for testing. A Tensilon universal-testing machine (RTC-1310, manufactured by Orientech Inc.) was used as a testing instrument, and a test was performed under conditions wherein the chuck interval was 120 mm and the test rate was 200 mm/minute.

[Test example 2] Bending test (Conforms with JIS K-7203)

In terms of the respective pellets obtained in Preparation example 1, test pieces having a thickness of 6 mm, a width of 10 mm, and a length of 12 cm were fabricated by means of an injection molding machine (IS55EPN, manufactured by Toshiba Machine Co., Ltd.), and the pieces, after preservation for a day under conditions wherein the temperature was 23° C. and the relative humidity was 50%, were supplied for testing. A Tensilon universal-testing machine (RTC-1310, manufactured by Orientech Inc.) was used as a testing instrument, and a test was performed under a condition wherein the test rate was 3 mm/minute.

[Test example 3] Bleeding

In terms of the respective pellets obtained in Preparation example 1, test pieces having a thickness of 3 mm, a width of 10 mm, a length of 10 mm were fabricated by means of an injection molding machine (IS55EPN, manufactured by Toshiba Machine Co., Ltd.) and preserved for a week under conditions wherein the temperature was 50° C. and the relative humidity was 50%, and then the degree of bleeding was observed.

The results of the above tests are shown in Tables 1–5. Herein, the "part" in the tables represents parts by weight.

TABLE 1

|  | Example 1 | Example 2 | Example 3 |
|---|---|---|---|
| Plasticizer sample | Sample 3 | Sample 3 | Sample 3 |
| Blending amount (part) | 5 | 20 | 50 |
| Maximum tensile stress (Mpa) | 66.2 | 17.2 | 7.2 |
| Modulus of elasticity in tension (Mpa) | 935.1 | 56.9 | 26.7 |
| Maximum bending stress (Mpa) | 39.2 | 14.8 | 5.9 |
| Modulus of elasticity in bending (Mpa) | 367.2 | 44.5 | 24.9 |
| Bleeding | None | None | None |

TABLE 2

|  | Example 4 | Example 5 | Example 6 | Example 7 | Example 8 | Example 9 |
|---|---|---|---|---|---|---|
| Plasticizer sample | Sample 4 | Sample 5 | Sample 6 | Sample 7 | Sample 1 | Sample 2 |
| Blending amount (part) | 20 | 20 | 20 | 20 | 20 | 20 |
| Maximum tensile stress (Mpa) | 17.3 | 18.4 | 21.2 | 23.5 | 19.2 | 18.5 |
| Modulus of elasticity in tension (Mpa) | 58.5 | 60.1 | 88.7 | 102.2 | 61.4 | 58.7 |
| Maximum bending stress (Mpa) | 16.3 | 17.8 | 20.9 | 24.8 | 17.8 | 15.1 |
| Modulus of elasticity in bending (Mpa) | 45.4 | 46.9 | 67.6 | 91.3 | 47.3 | 46.3 |
| Bleeding | None | None | Slightly | Somewhat significant | None | None |

TABLE 3

|  | Example 10 | Example 11 | Example 12 |
|---|---|---|---|
| Plasticizer sample | Sample 9 | Sample 9 | Sample 9 |
| Blending amount (part) | 5 | 20 | 50 |
| Maximum tensile stress (Mpa) | 72.8 | 18.9 | 7.9 |
| Modulus of elasticity in tension (Mpa) | 1028.6 | 62.6 | 29.4 |
| Maximum bending stress (Mpa) | 43.1 | 16.3 | 6.5 |
| Modulus of elasticity in bending (Mpa) | 403.9 | 48.9 | 27.4 |
| Bleeding | None | None | None |

TABLE 4

|  | Example 13 | Example 14 | Example 15 | Example 16 | Example 17 | Example 18 |
|---|---|---|---|---|---|---|
| Plasticizer sample | Sample 11 | Sample 12 | Sample 13 | Sample 14 | Sample 8 | Sample 10 |
| Blending amount (part) | 20 | 20 | 20 | 20 | 20 | 20 |
| Maximum tensile stress (Mpa) | 19.0 | 20.2 | 23.3 | 25.9 | 15.6 | 18.2 |
| Modulus of elasticity in tension (Mpa) | 64.4 | 66.1 | 195.2 | 449.6 | 56.4 | 57.0 |
| Maximum bending stress (Mpa) | 17.9 | 19.6 | 23.0 | 27.3 | 14.4 | 15.1 |
| Modulus of elasticity in bending (Mpa) | 49.9 | 51.6 | 148.8 | 401.6 | 44.5 | 46.1 |
| Bleeding | None | None | Slightly | Somewhat significant | Slightly | None |

TABLE 5

|  | Comparative example 1 | Comparative example 2 | Comparative example 3 | Comparative example 4 | Comparative example 5 |
|---|---|---|---|---|---|
| Plasticizer sample | Sample 15 | Sample 16 | Sample 17 | Sample 18 | None |
| Blending amount (part) | 20 | 20 | 20 | 20 |  |
| Maximum tensile stress (Mpa) | 55.1 | 45.7 | 42.1 | 38.4 | 81.4 |
| Modulus of elasticity in tension (Mpa) | 1264.7 | 1086.2 | 926.7 | 889.4 | 2552.3 |
| Maximum bending stress (Mpa) | 47.8 | 926.7 | 40.5 | 34.6 | 100.7 |
| Modulus of elasticity in bending (Mpa) | 1099.2 | 889.4 | 869.3 | 786.2 | 2707.0 |
| Bleeding | Significant | Significant | Significant | None | None |

According to the present invention, flexibility is provided for the aliphatic polyester composition containing polylactic acid or a lactic unit, as a result, the aliphatic polyester compositions can be satisfactorily used as flexible moldings such as packaging films for food, medical supplies, and cosmetics, etc., films for agriculture, films for engineering and construction and the like, and as extensive materials. In particular, in collection of municipal refuse, by separately collecting refuse such as scraps of vegetables with the bags of the present invention, not only does incineration but disposal by composting the garbage also become possible.

What is claimed is:

1. An aliphatic polyester composition comprising an aliphatic polyester and 5–50 parts by weight of a polyglycerol acetic ester per 100 parts of said aliphatic polyester.

2. An aliphatic polyester composition of claim 1, wherein the polymerization degree of polyglycerol as a component of polyglycerol acetic ester is 2–4.

3. An aliphatic polyester composition of claim 1, wherein the acetylization degree of polyglycerol acetic ester is 50–100%.

4. An aliphatic polyester composition of claim 1, wherein the polyglycerol acetic ester is selected from the group consisting of diglycerol diacetate, diglycerol triacetate, diglycerol tetraacetate, and mixtures thereof.

5. An aliphatic polyester composition of claim 1, wherein the aliphatic polyester is polylactic acid.

6. Flexible products which are obtained by molding the aliphatic polyester composition of claim 1 into films, sheets, or bags.

7. The aliphatic polyester composition of claim 1, wherein said aliphatic polyester is a polylactic acid and copolymers thereof.

8. The aliphatic polyester composition of claim 7, wherein said aliphatic polyester is a copolymer of lactic acid and at least one compound selected from the group consisting of glycolic acid, ε-caprolactone, trimethylene carbonate, and polyethylene glycol.

9. The aliphatic polyester composition of claim 1, wherein said aliphatic polyester is biodegradable and wherein said composition further comprises a second biodegradable resin.

10. The aliphatic polyester composition of claim 9, wherein said second biodegradable resin is selected from the group consisting of cellulose acetate, polycaprolactone, polybutylene succinate, a polyhydroxybutyrate-valerate copolymer, chitin, chitosan and starch.

11. The aliphatic polyester composition of claim 1, wherein said aliphatic polyester is biodegradable.

12. An aliphatic polyester composition comprising an aliphatic polyester, polyglycerol acetic ester and 5–50 parts by weight of a compound represented by the following general formula (1) based on 100 parts by weight of said aliphatic polyester, General formula (1)

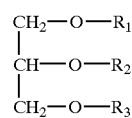

wherein in the general formula 1, one or two of $R_1$, $R_2$, and $R_3$ is an acyl group having 8–22 carbon atoms and the rest thereof are acetyl groups or hydrogen atoms.

13. An aliphatic polyester composition of claim 12, wherein
in the general formula (1), one or two of $R_1$, $R_2$, and $R_3$ is an acyl group having 8–18 carbon atoms and the rest thereof are acetyl groups or hydrogen atoms.

14. An aliphatic polyester composition of claim 12, wherein
the compound represented by the general formula (1) is at least one selected from glycerol diacetomonocaprirate, glycerol diacetomonolaurate, and glycerol diacetomonooleate.

* * * * *